(12) United States Patent
McCullough

(10) Patent No.: US 12,460,663 B2
(45) Date of Patent: Nov. 4, 2025

(54) MOUNTING CLIP

(71) Applicant: David Robert McCullough, Milner, GA (US)

(72) Inventor: David Robert McCullough, Milner, GA (US)

(*) Notice: Subject to any disclaimer, the term of this patent is extended or adjusted under 35 U.S.C. 154(b) by 0 days.

(21) Appl. No.: 18/940,994

(22) Filed: Nov. 8, 2024

(65) Prior Publication Data

US 2025/0257748 A1 Aug. 14, 2025

Related U.S. Application Data

(60) Provisional application No. 63/552,788, filed on Feb. 13, 2024.

(51) Int. Cl.
*F16B 2/24* (2006.01)
*F16M 13/02* (2006.01)

(52) U.S. Cl.
CPC .......... *F16B 2/243* (2013.01); *F16M 13/02* (2013.01)

(58) Field of Classification Search
CPC ........ F16B 2/243; F16B 2/245; F16B 21/086; F16B 21/08; F16B 2/24; F16B 21/075; F16B 5/0657; F16M 13/02
See application file for complete search history.

(56) References Cited

U.S. PATENT DOCUMENTS

| | | |
|---|---|---|
| 1,447,126 A | 2/1923 | Dwyer |
| 4,126,971 A | 11/1978 | Macuga et al. |
| 4,979,712 A | 12/1990 | Rios |
| 5,087,007 A | 2/1992 | Gaderick |
| 5,428,867 A | 7/1995 | Hannerstig |
| 6,254,049 B1 | 7/2001 | Goehly |
| 7,185,864 B2 | 3/2007 | Adams |
| 7,735,189 B2 | 6/2010 | Richardson |
| 8,875,770 B1 | 11/2014 | Martin et al. |
| 8,898,872 B2 | 12/2014 | Raymond |
| 9,578,995 B2 | 2/2017 | Hanley |
| D818,803 S | 5/2018 | Rogers |
| 10,766,319 B2 | 9/2020 | Hack |
| D920,084 S | 5/2021 | Craig |
| 11,015,632 B2 * | 5/2021 | De Jong ................. F16B 2/245 |
| 11,817,817 B2 | 11/2023 | Wedding et al. |
| 2004/0194265 A1 | 10/2004 | Santoro |
| 2007/0261330 A1 | 11/2007 | Liu |
| 2009/0183428 A1 | 7/2009 | Agullo |

(Continued)

FOREIGN PATENT DOCUMENTS

EP     3670937 A1 *  6/2020 .............. F16B 2/243

*Primary Examiner* — Lee A Holly
(74) *Attorney, Agent, or Firm* — Dunlap Bennett & Ludwig, PLLC; Jeff A. Burke

(57) ABSTRACT

A mounting clip and method of use are provided. The mounting clip is monolithically formed and includes a plurality of bends defining portions of the clip. The mounting clip has a first bend at a midpoint between the first end and the second end of the material that defines a substantially V-shaped body. Each of the first end and the second end defines a tab portion where a first tab portion is defined by a bend a first distance from the first end and a second tab portion is defined by a bend a second distance from the end. To use the mounting clip a user can mount a portion of a fixture in the first bend and can secure the clip to a structure utilizing each of the tab portions.

11 Claims, 4 Drawing Sheets

(56) References Cited

U.S. PATENT DOCUMENTS

| | | |
|---|---|---|
| 2009/0272036 A1 | 11/2009 | Stephens |
| 2012/0018106 A1 | 1/2012 | Robledo |
| 2015/0074961 A1 | 3/2015 | Glaze et al. |
| 2015/0076304 A1 | 3/2015 | Hattori |
| 2019/0011078 A1 | 1/2019 | Olsen |

* cited by examiner

MOUNTING CLIP

CROSS-REFERENCE TO RELATED APPLICATIONS

This application claims the benefit of priority of U.S. provisional application No. 63/552,788, filed Feb. 13, 2024, the contents of which are herein incorporated by reference.

BACKGROUND OF THE INVENTION

Field of Endeavor

The present invention relates to mounting devices, and more particularly, to a mounting device for mounting structures to commercial and industrial roofs and ceilings.

Background of Related Art

Mounting fixtures to a roof or ceiling, particularly in a commercial or industrial context, can be costly, inefficient, and labor-intensive. Recent attempts to provide mounting systems are bulky, require mounting hardware, and require considerable time for installation. For example, prior art mounting systems need to be bolted to a structure of a roof, or ceiling, which requires a tradesman to keep track of mounting hardware, have tools specifically for mounting hardware, and spend extra-time on installation. In the context of industrial mounting systems this extra time is a cost, not only to the consumer, but also to the tradesman, who may have to forgo additional jobs due to the extra time needed for an installation.

As can be seen, there is a need for a mounting device that requires no mounting hardware and can be installed quickly and efficiently.

SUMMARY OF THE INVENTION

In one aspect of the present invention, a monolithically formed clip is provided for mounting items to structures. The monolithically formed clip can have a substantially V-shaped body and a plurality of tab portions. A first of the plurality of tab portions can be defined by a portion of the clip that is between the first end and a bend a first distance from the first end. A second of the plurality of tab portions can be defined by a portion of the clip that is between a second end and a bend a second distance from the second end. The monolithically formed clip can be formed from rigid yet flexible materials, such as steel, or other metals, or polymers, and can be manufactured utilizing known methods in the art.

In another aspect of the present invention, a method of using a monolithically formed clip is provided. The method can begin by providing an industrial clip comprising: a first arm coupled to a second arm by a first bend, a first tab coupled to the first arm by a second bend, and a second tab coupled to the second arm by a third bend, to a user. Once provided, a user can mount a portion of a fixture into the first bend of the industrial clip. Once mounted, the user can secure the first tab to a first portion of a structure, and secure the second tab to a second portion of the structure.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As stated above, current mounting devices are bulky, require mounting hardware, and are labor-intensive to install. Inefficiencies associated with prior art mounting systems include: the need for additional, installation specific equipment; time required to install the prior art mounting system in addition to installation of the fixture being mounted; the need for additional labor and labor time; and finally, the opportunity cost associated with lost jobs due to the additional time spent on installation.

Broadly, an embodiment of the present invention provides a quick and efficient mounting device that requires no additional hardware or tools for installation.

Figure 1:
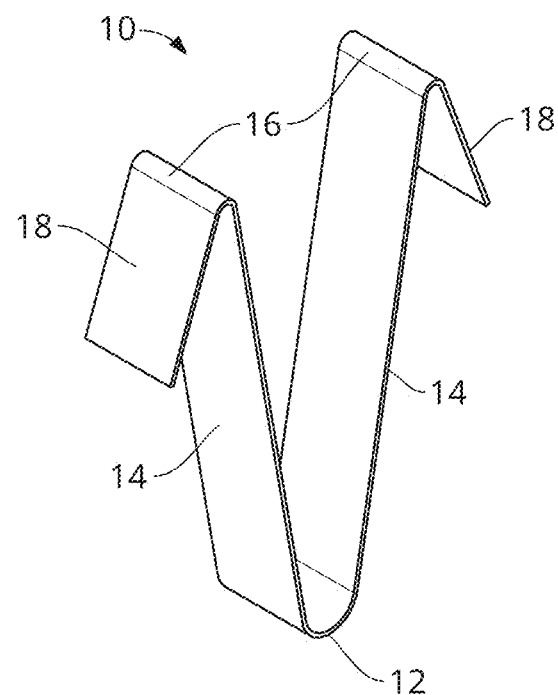
FIG. 1 is a perspective view of an embodiment of a mounting device, according to aspects of the present invention.
Figure 2:
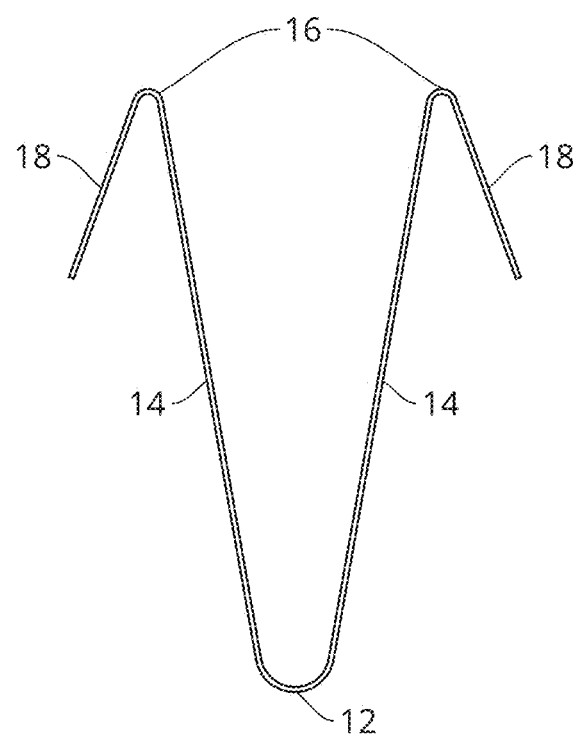
FIG. 2 is an elevation view of an embodiment of a mounting device, according to aspects of the present invention.

Referring now to FIGS. 1-2, FIG. 1 illustrates a perspective view of an embodiment of the inventive mounting device 10, hereinafter "McCulla Clip", according to aspects of the present invention. The McCulla Clip 10 can be formed from a single-continuous piece of material, such as metals, plastics, etc. In embodiments, McCulla Clip 10 can be made of any material having suitable load bearing properties and suitable elasticity such that McCulla clip 10 can, once deformed, return to its original shape/configuration. In embodiments, the choice of material can be customized for different load sizes, types, weights, and/or applications. In one embodiment, the material that can form the McCulla Clip 10 can be steel, specifically 22-gauge steel. In an embodiment, the shape of McCulla Clip 10 can be substantially V-shaped, which can prevent movement of a fixture installed utilizing McCulla clip 10.

Manufacture of McCulla clip 10 can be accomplished by bending, or working material, machining material, molding, or applying other additive manufacturing processes applied to material, into the appropriate shape/configuration. In embodiments, McCulla clip 10 have a first end and a second end and can be substantially V-Shaped having a plurality of bends thereon. In embodiments, each of the bends defines a continuous transition into differing components of McCulla Clip 10. In embodiments, a first plurality of bends 16 occur a first length from both first end and second end, which defines a transition from tabs 18 to arms 14. In embodiments, a second bend 12 can occur at a midpoint between first end and second end, and defines a transition from first arm 14 to a second arm 14. Advantageously, McCulla clip 10 provides a one-piece construction for simplified manufacture and installation.

FIG. 2 illustrates an elevation view of the McCulla Clip 10, according to aspects of the present invention. McCulla Clip 10 can be formed from a continuous piece of material that can measure substantially 9 inches in length and substantially ¾ inches in width, although length and width can be modified to suit customized applications. In a specific embodiment McCulla Clip 10 can be formed from 22-guage steel measuring approximately 9.75 inches in length and approximately 0.75 inches in width. In embodiments, the first plurality of bends 16 can be made such that a distance between the first end and a first one of the first plurality of bends 16 can be approximately 1.25 inches, defining a first one of tabs 18, and a distance between the second end and a second one of the first plurality of bends 16 can be approximately 1.25 inches, defining a second one of tabs 18. In embodiments, each of the plurality of bends 16 can have a diameter of 0.125 inches. Additionally, each of the plurality of bends 16 can define an angle between one of the plurality of arms 14 and one of the plurality of tabs 18, the angle being between 15-45°. In a specific embodiment, the angle can be 30°.

McCulla clip 10 can have a bend 12, at a midportion, to form a substantially V-shape. In an embodiment, the taper, or angle of the V-shape can be 10 degrees, such that the distance between the opening of the V measured between the plurality of bends 16 can be 2.625 inches. In an embodiment, the diameter of the apex of the V-shape can be 0.5 inches. While specific dimensions are disclosed for lengths, widths, diameters, angles, etc., it is contemplated that other dimensions may be used without departing from the scope of the invention.

Figure 3:
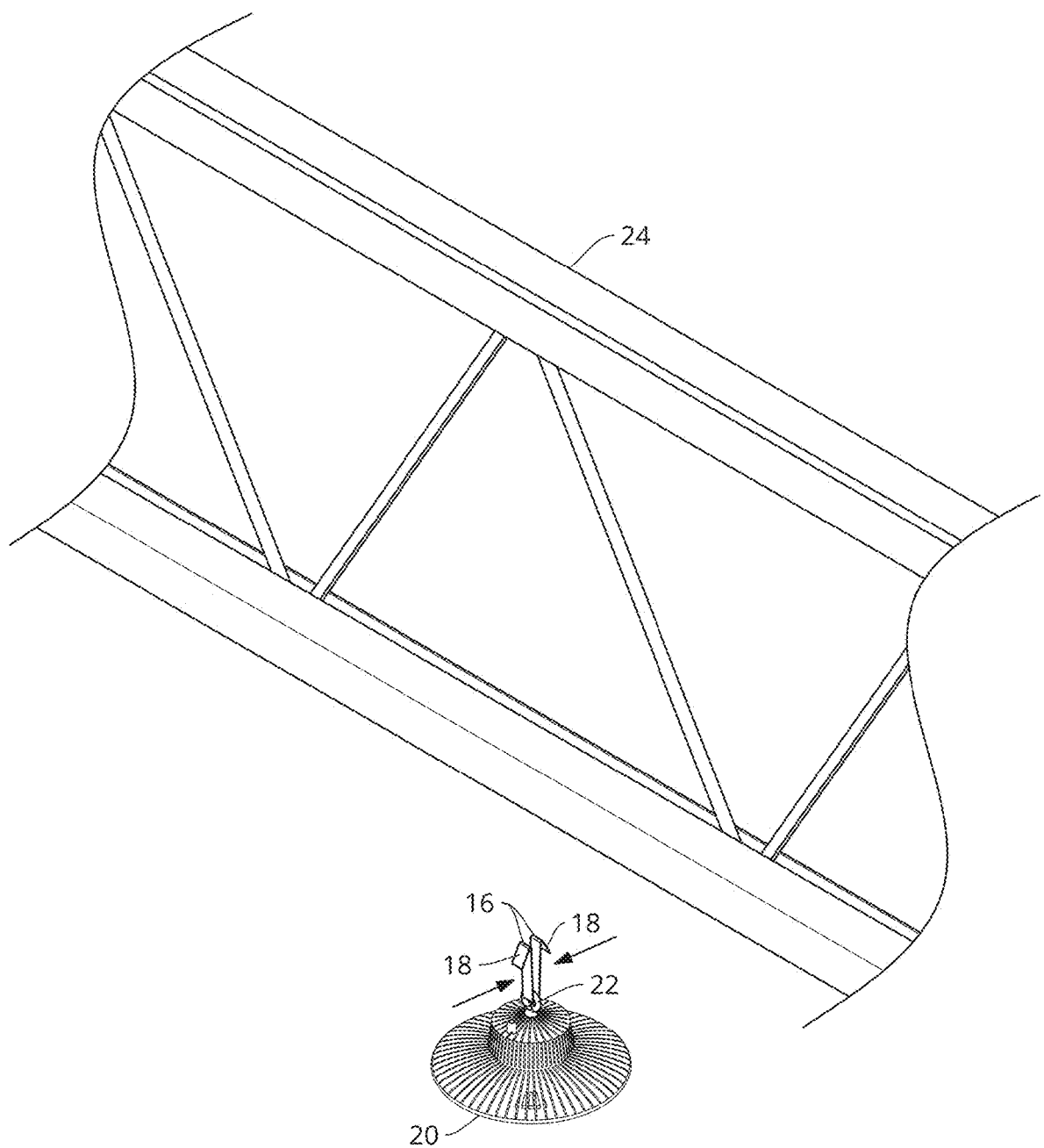
FIG. 3 is a perspective view of an embodiment of a mounting device shown in-use, according to aspects of the present invention.
Figure 4:
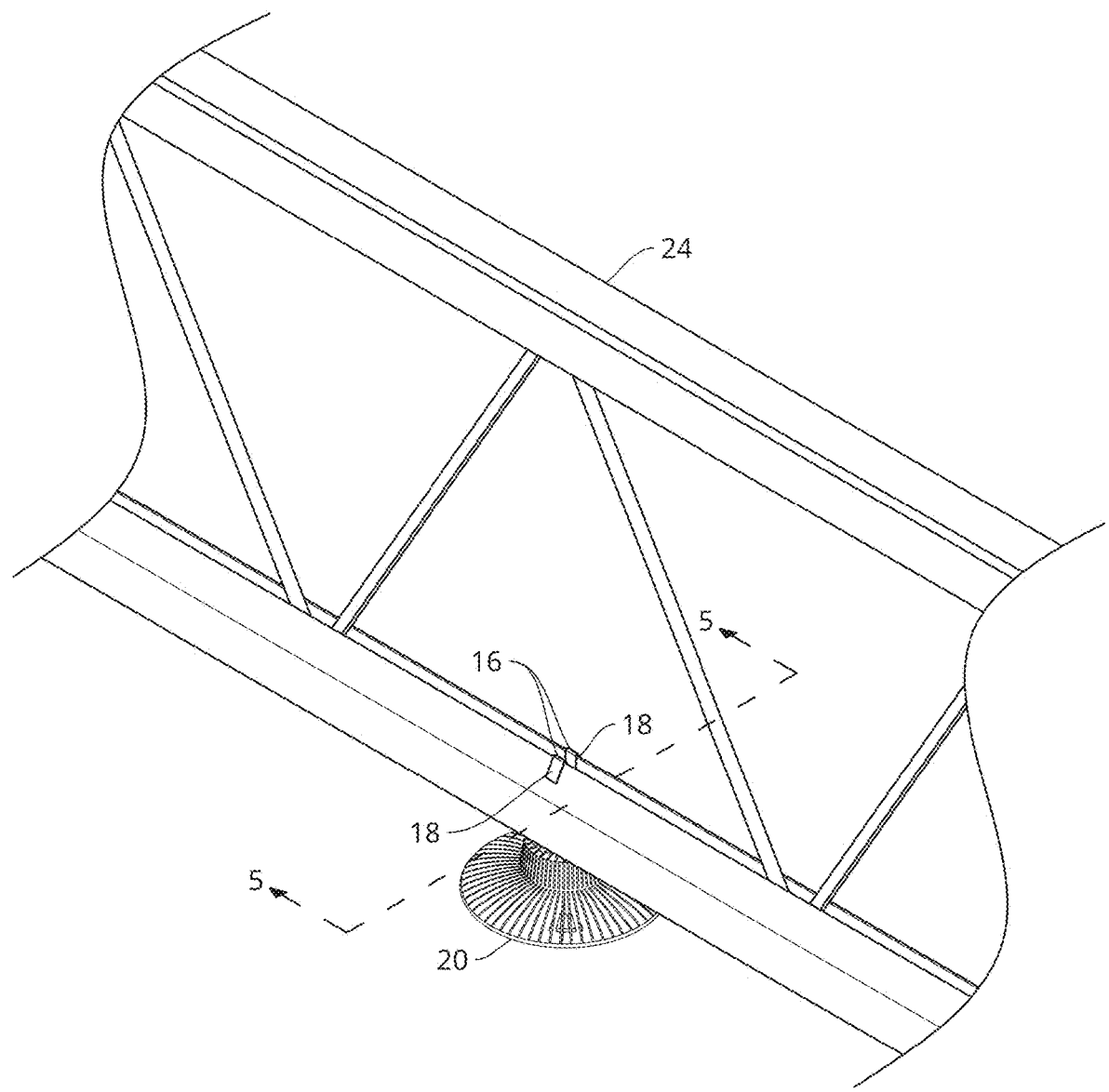
FIG. 4 is a perspective view of an embodiment of a mounting device shown installed, according to aspects of the present invention.
Figure 6:
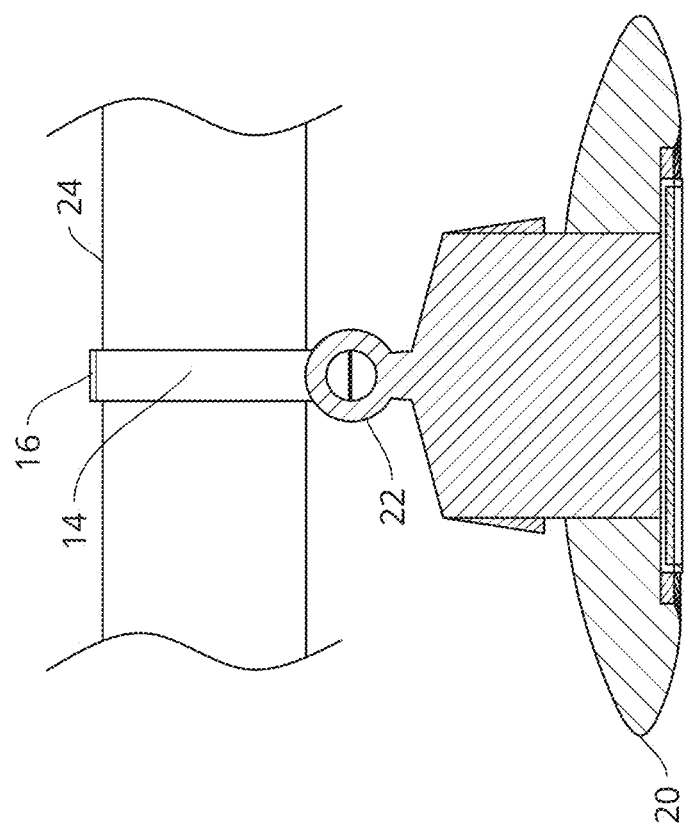
FIG. 6 is a cross-sectional view of an embodiment of a mounting device taken along line 6-6 of FIG. 5.
Figure 5:
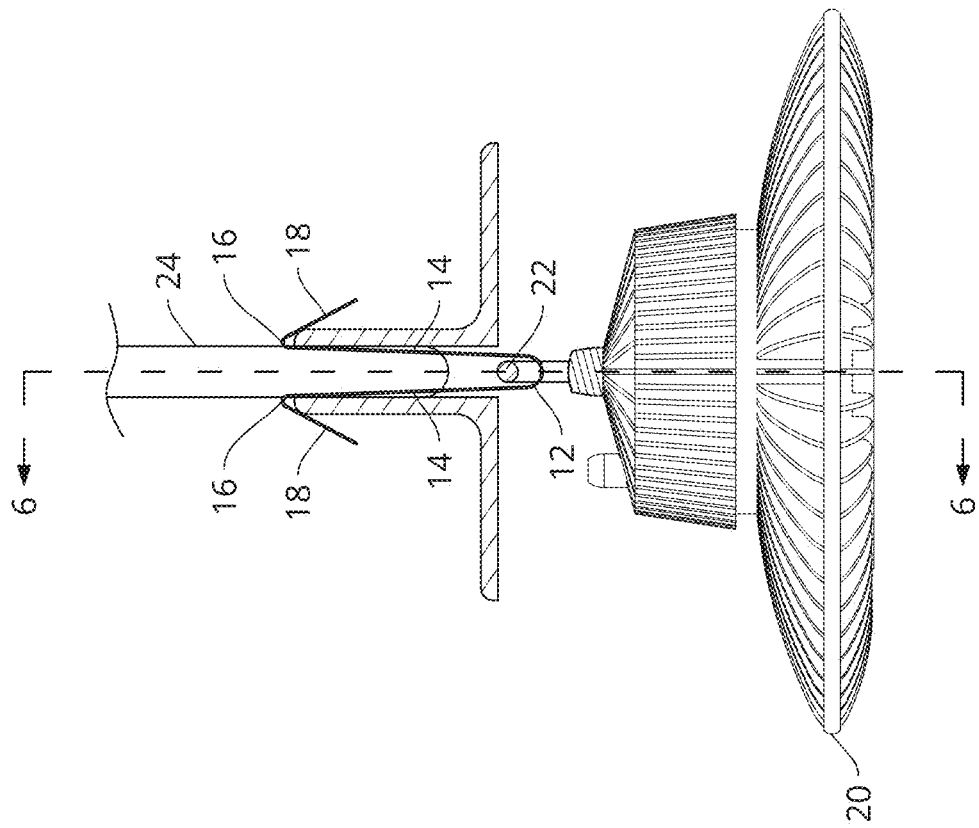
FIG. 5 is a cross-sectional view of an embodiment of a mounting device taken along line 5-5 of FIG. 4.

FIGS. 3-6 illustrate aspects of McCulla clip 10 shown in use. In embodiments, a fixture 20, such as a light, can include an attachment interface 22, such as an eyelet, hook, or other attachment. A user can cause Attachment interface 22 to be disposed through McCulla clip 10 such that it is centered on bend 12, thereby balancing fixture 20 (as shown in FIG. 6). Once centered, user can, optionally, compress McCulla clip 10 by pressing inward on tabs 18, or arms 14, such that McCulla clip 10 can be fit into an installation space, such as between spaces of joist 24 (as shown in FIG. 3). Alternatively, user can cause McCulla clip 10 to be compressed by forcing clip 10 into the space, thereby causing compression (as shown in FIG. 5). In additional embodiments, installation of McCulla clip 10 does not require compression and in that case tabs 18 can be placed over a structure, such as joist 24, thereby providing support for fixture 20 (as shown in FIG. 4).

It should be understood, of course, that the foregoing relates to exemplary embodiments of the invention and that modifications may be made without departing from the spirit and scope of the invention as set forth in the following claims.

What is claimed is:

1. An industrial clip, comprising:
   a first arm coupled to a second arm by a first bend, wherein the first bend has a diameter of approximately 0.5 inches;
   a first tab coupled to the first arm by a second bend; and
   a second tab coupled to the second arm by a third bend.

2. The industrial clip of claim 1, wherein an apex of the first bend is at a midpoint along the length of the single material.

3. The industrial clip of claim 1, wherein the second bend and the third bend each have a diameter of approximately 0.125 inches.

4. The industrial clip of claim 1, wherein the single material is steel.

5. The industrial clip of claim 1, wherein the single material is steel.

6. A monolithic industrial clip, comprising:
   a body having a first bend, a first end, and a second end, the first bend at a midpoint between the first end and the second end, the first bend having a diameter of 0.25 inches;
   a first tab defined by a second bend at a first distance as measured from the first end, the second bend having a diameter of 0.125 inches; and
   a second tab defined by a third bend at a second distance as measured from the second end, the third bend having a diameter of 0.125 inches, wherein the first distance and the second distance are equal.

7. The monolithic industrial clip of claim 6, wherein the first distance and the second distance are approximately 1.25 inches.

8. The monolithic industrial clip of claim 7, wherein a length of the industrial clip is approximately 9.75 inches, and a width of industrial clip is 0.75 inches.

9. An industrial clip, comprising:
   a first arm coupled to a second arm by a first bend;
   a first tab coupled to the first arm by a second bend; and
   a second tab coupled to the second arm by a third bend, wherein the second bend and the third bend each have a diameter of approximately 0.125 inches.

10. The industrial clip of claim 9, wherein an apex of the first bend is at a midpoint along the length of the single material.

11. The industrial clip of claim 9, wherein the first bend has a diameter of approximately 0.5 inches.

* * * * *